(12) United States Patent
Bohne

(10) Patent No.: US 6,316,916 B2
(45) Date of Patent: Nov. 13, 2001

(54) METHOD AND MECHANISM TO PREVENT CORRUPTION OF DATA

(75) Inventor: William Clifford Bohne, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/738,090

(22) Filed: Dec. 15, 2000

Related U.S. Application Data

(60) Provisional application No. 60/172,396, filed on Dec. 17, 1999.

(51) Int. Cl.[7] .................................................. H02J 7/04
(52) U.S. Cl. ...................................... 320/150; 320/137
(58) Field of Search .................................. 320/150, 137, 320/106, 107, 136, 165; 429/61, 62

(56) References Cited

U.S. PATENT DOCUMENTS

| | | | |
|---|---|---|---|
| 5,444,378 | * 8/1995 | Rogers | 320/150 |
| 5,754,027 | * 5/1998 | Oglesbee et al. | 320/120 |
| 6,181,103 | * 1/2001 | Chen | 320/106 |

* cited by examiner

*Primary Examiner*—Peter S. Wong
*Assistant Examiner*—Lawrence Luk

(57) ABSTRACT

A circuit for preventing corruption of battery-specific data transferred from a battery-specific data element to a battery charger when a battery is electrically coupled to both the battery charger and to a load includes a charger connection sensor and an interrupter circuit. The charger connection sensor is capable of sensing when the battery is connected to the battery charger. The interrupter circuit is responsive to the charger connection sensor. The interrupter circuit electrically couples the battery-specific data element to a load side battery-specific data node when the charger connection sensor indicates that the battery is not connected to the battery charger and electrically uncouples the battery-specific data element to the battery-specific data node accessible by the load when the charger connection sensor indicates that the battery is connected to the battery charger.

5 Claims, 2 Drawing Sheets

METHOD AND MECHANISM TO PREVENT CORRUPTION OF DATA

CROSS-REFERENCE TO RELATED APPLICATIONS

This application claims priority from U.S. Provisional Application Ser. No. 60/172,396, filed Dec. 17, 1999, the disclosures of which, including all attached documents and appendices, are incorporated by reference in their entirety for all purposes.

TECHNICAL FIELD

The present invention relates to electronic circuits and, more specifically, to electronic circuits employed in battery chargers.

BACKGROUND

Many "smart" battery units include a battery and a device that gives information about the battery to such devices as battery chargers and other host devices that are powered by the battery (e.g., radios, telephones, etc.). One such device is a code resistor that identifies characteristics of the battery. The value of a code resistor may be determined by the battery charger, based on a current supplied to bias the code resistor and the voltage sensed across the code resistor. A smart battery unit might also include a battery monitor circuit that provides information to the host device during use.

Existing smart battery units allow the code resistor to be connected to the host device when the battery unit is also connected to a battery charger. Current to the code resistor could be supplied by both the battery charger and the host device. This results in a voltage across the code resistor being sensed by the battery charger that is different from the expected voltage for a given battery type. This can cause the battery charger to go off-line or to attempt to charge the battery in an incorrect manner.

Therefore, there is a need for a circuit that isolates a code resistor in a battery unit from a load when the battery unit is also connected to a battery charger.

DETAILED DESCRIPTION OF THE INVENTION

Figure 1:
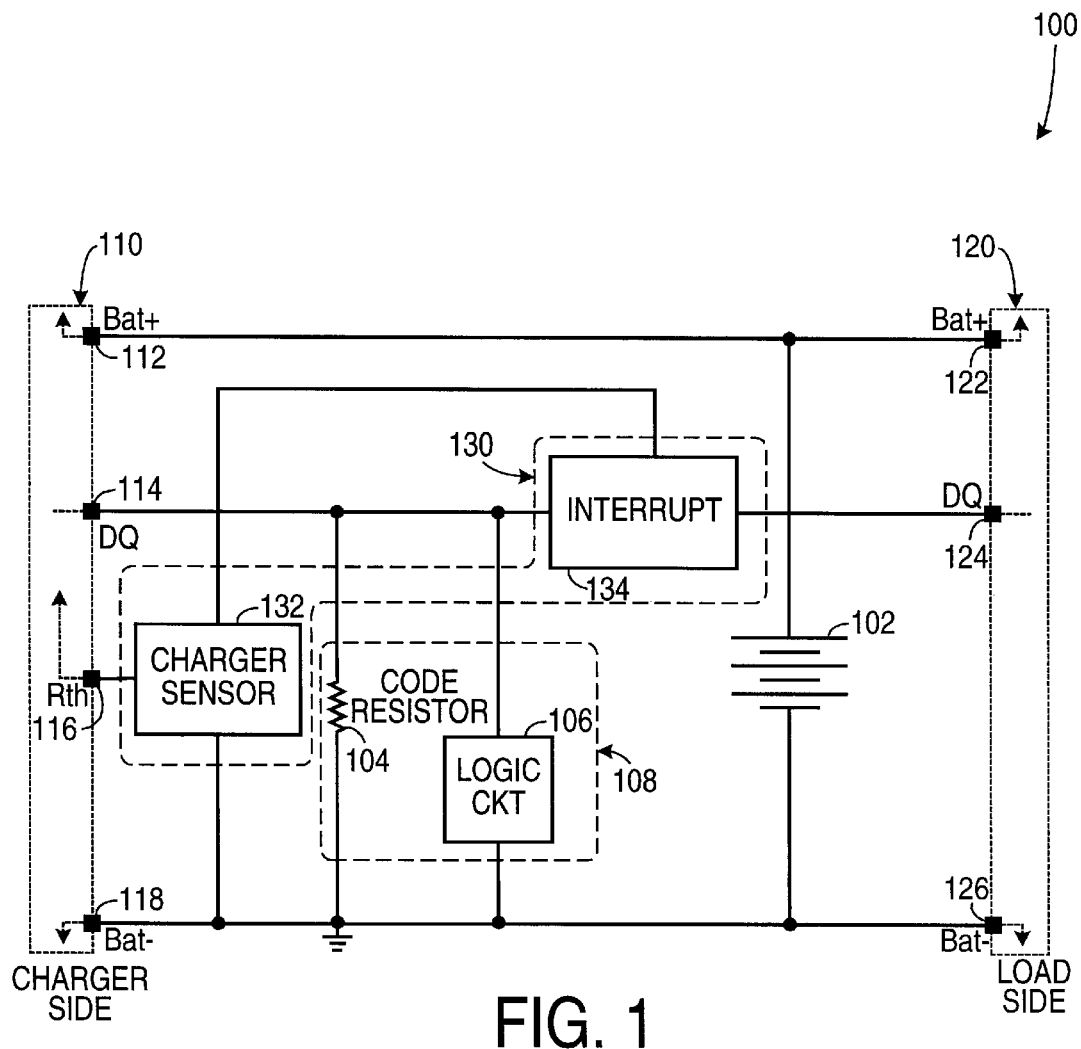
FIG. 1 is a block diagram of an exemplary embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "data" includes information conveyed by either or both a digital or an analog signal.

As shown in FIG. 1, one embodiment of the invention is a data integrity circuit 130 for preventing corruption of battery-specific data transferred from a battery-specific data element 108 in a "smart" battery unit 100. The smart battery unit 100 is capable of interfacing a battery 102 to a battery charger 110 and a load 120 (e.g., a radio or cell telephone). On the charger side the smart battery unit 100 includes a positive battery terminal node 112, a negative battery terminal node 118, a battery data node 114 and a charger connection sensor node 116, also referred to herein as a pull-up node. On the load side, the smart battery unit 100 includes a positive battery terminal node 122, a negative battery terminal node 126 and a battery data node 124. The battery-specific data element 108, which could include an element such as a code resistor 104, a logic circuit 106 (e.g., an EEPROM or other device), or both, provides information to the battery charger 110 and the load 120 relating to the characteristics of the battery.

The circuit 130 prevents corruption of battery-specific data from the battery-specific data element 108 that is transferred to the battery charger 110 when the battery 102 is electrically coupled to both the battery charger 110 and to a load 120. The data integrity circuit 130 includes a charger connection sensor 132 and an interrupter circuit 134. The charger connection sensor 132 is capable of sensing when the battery 102 is connected to the battery charger 110. The interrupter circuit 134 is responsive to the charger connection sensor 132. The interrupter circuit 134 electrically couples the battery-specific data element 108 to a load side battery-specific data node 124 (which is accessible by the load 120) when the charger connection sensor 132 indicates that the battery 102 is not connected to the battery charger 110 and electrically uncouples the battery-specific data element 108 to the battery-specific data node 124 when the charger connection sensor 132 indicates that the battery 102 is connected to the battery charger 110.

Figure 2:
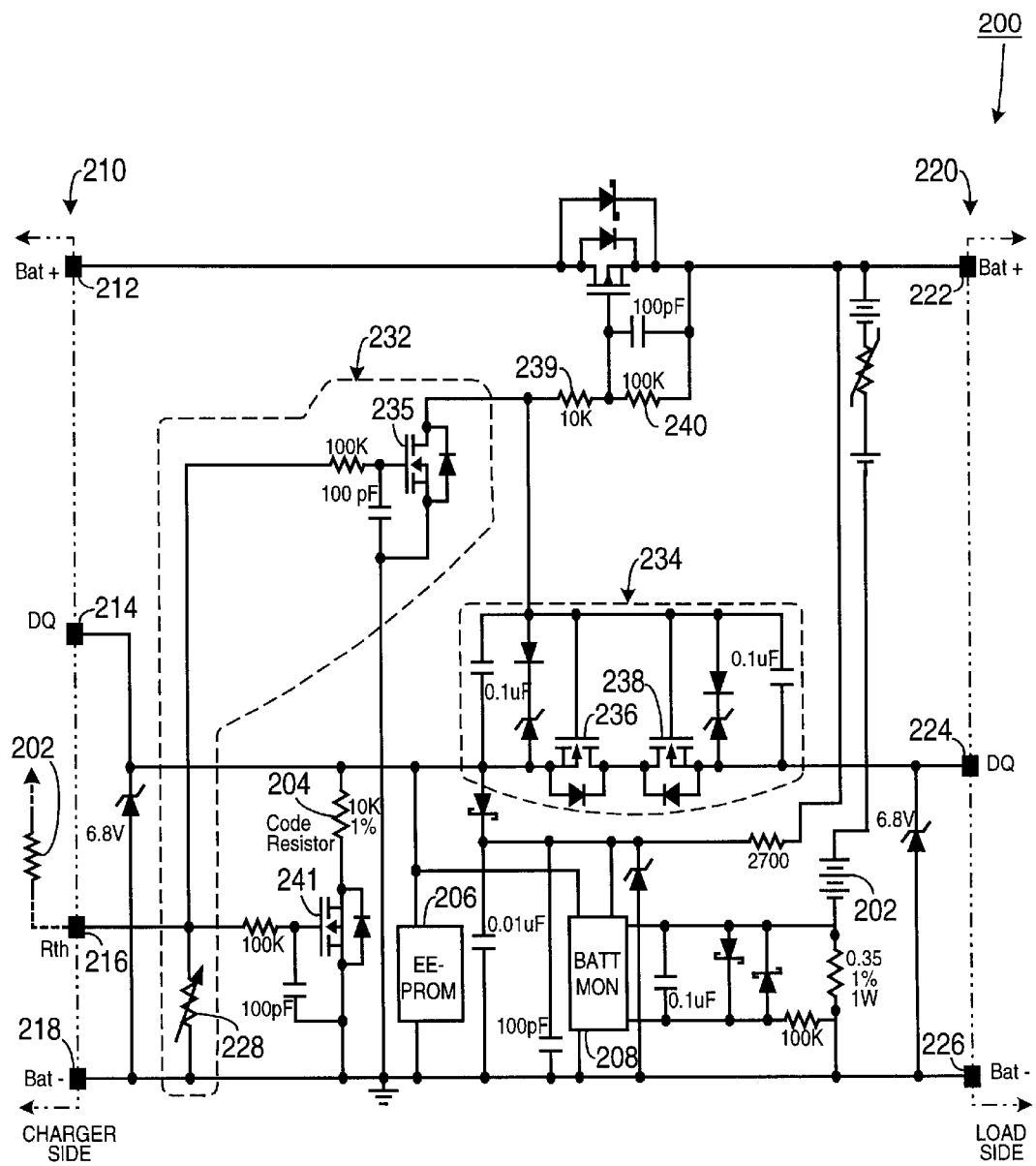
FIG. 2 is a schematic diagram of one specific embodiment of the invention.

One specific embodiment is shown in FIG. 2, the battery charger includes a pull-up resistor 202 that electrically couples the pull-up node 216 to a reference voltage when the battery 202 is connected to the battery charger 210. The charger connection sensor 232, which includes a first resistor 228 (such as a negative coefficient thermistor) electrically couples the pull-up node 216 to a ground. The pull-up node 216 will have a first voltage (which is relatively high) when the first resistor 228 is electrically coupled to the pull-up resistor 202. Decoupling the first resistor 228 from the pull-up resistor 202 will cause the voltage of the pull up node 216 to drop substantially to ground. The pull-up node 216 is connected to the gate of a field effect transistor 235, which acts as a control switching element. When the pull-up node 216 is electrically low, the field effect transistor 235 turns "off," allowing the voltage of the battery 202 to be applied to the input of the interrupter circuit 234 through resistors 239 and 240. When the voltage of the pull-up node 216 is high, the field effect transistor 235 turns "on" and couples the input of the interrupter circuit 234 to ground.

The interrupter circuit 234 includes a first field effect transistor 236 and a second field effect transistor 238. The first field effect transistor 236 has a first gate, which is electrically coupled to the output of the charger connection sensor 232, a first source and a first drain, which is in series with the charger side battery data node 214. A first parasitic diode exists between the first source and the first drain. The first field effect transistor 236 is biased so that parasitic current may flow though the first parasitic diode in only a first direction. The first field effect transistor 236 and the second field effect transistor 238 are biased so that current is allowed to flow between the charger side battery data node 214 and the load side battery data node 224 when field effect transistor 235 is turned "off." Similarly, the second field effect transistor 238 has a second gate, which is also electrically coupled to the output of the charger connection sensor 232, a second source that is electrically coupled to the first source of the first field effect transistor 236, and a second drain, which is electrically coupled to the load side battery data node 224. (While in the embodiment shown, transistors 236 and 238 have common sources, it will be readily understood that a circuit employing common drains, rather than common sources, could be constructed without departing from the scope of the invention.) A second parasitic diode exists between the second source and the second drain. Therefore, the second field effect transistor 238 is biased so that parasitic current may flow through the second parasitic diode in only a second direction, which is different from the first direction. Thus, when field effect transistors 236 and 238 are turned "off," the first and second parasitic diodes are opposed to each other and no current flows between the code resistor 204 and the load side battery data node 224. The second source is in series with the load side battery-specific data node 224.

When the voltage at node 216 is low (signifying disconnection from the battery charger 210), transistor 235 is in the "off" state, which causes the voltage at the gates of transistors 236 and 238 to go high, turning both of these transistors "on." Transistor 241 also turns "off," so that data from elements 206 and 208 can be transferred without interference from the code resistor 204. When the voltage at node 216 is high (signifying connection to the battery charger 210), transistor 235 is in the "on" state, which causes the voltage at the gates of transistors 236 and 238 to be pulled down, turning both of these transistors "off." Transistor 241 turns "on," so that the resistance of the code resistor 204 may be sensed by the charger 210.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A circuit for preventing corruption of battery-specific data transferred from a battery-specific data element to a battery charger when a battery is electrically coupled to both the battery charger and to a load, comprising:
    a. a charger connection sensor that is capable of sensing when the battery is connected to the battery charger; and
    b. an interrupter circuit, responsive to the charger connection sensor, that electrically couples the battery-specific data element to a load side battery-specific data node when the charger connection sensor indicates that the battery is not connected to the battery charger and that electrically uncouples the battery-specific data element to the battery-specific data node accessible by the load when the charger connection sensor indicates that the battery is connected to the battery charger.

2. The apparatus of claim 1, wherein the battery charger comprises a pull-up resistor that electrically couples a pull-up node to a reference voltage when the battery is connected to the battery charger and wherein the charger connection sensor comprises:

a. a first resistor that electrically couples the pull-up node to a ground, so that the pull-up node has a first voltage when the first resistor is electrically coupled to the pull-up resistor and so that the pull-up node has a second voltage, different from the first voltage, when the first resistor is not electrically coupled to the pull-up resistor; and b. a control switching element, having a gate electrically coupled to the pull-up node and a control node electrically coupled to the interrupter circuit so that the interrupter circuit electrically uncouples the battery-specific data element from the load side battery-specific data node when the pull-up node has the first voltage and so that the interrupter circuit electrically couples the battery-specific data element to the load side battery-specific data node when the pull-up node has the second voltage.

3. The apparatus of claim 2, wherein the first resistor comprises a negative coefficient thermistor.

4. The apparatus of claim 1, wherein the charger connection sensor generates a charger connection sensor output that is in a first state when the battery is connected to the battery charger and that is in a second state when the battery is not connected to the battery charger.

5. The apparatus of claim 4, wherein the interrupter circuit comprises:

a. a first field effect transistor having a first gate, a first source and a first drain, a first parasitic diode existing between the first source and the first drain, the first field effect transistor being biased so that parasitic current may flow though the first parasitic diode in only a first direction, the first drain being in series with a first selected one of the load side battery-specific data node or the battery-specific data element, the first gate being electrically coupled to the charger connection sensor output and the first field effect transistor being biased so that current is allowed to flow between the first source and the first drain when the charger connection sensor output is in the second state; and b. a second field effect transistor having a second gate, a second source and a second drain, a second parasitic diode existing between the second source and the second drain, the second field effect transistor being biased so that parasitic current may flow through the second parasitic diode in only a second direction, different from the first direction, the second drain being in series with a second selected one of the load side battery-specific data node or the battery-specific data element, the second selected one of the load side battery-specific data node or the battery-specific data element being different from the first selected one of the load side battery-specific data node or the battery-specific data element, the second gate being electrically coupled to the charger connection sensor output and the second field effect transistor being biased so that current is allowed to flow between the second source and the second drain when the charger connection sensor output is in the second state.

* * * * *